US009289707B2

(12) United States Patent
Izumi et al.

(10) Patent No.: US 9,289,707 B2
(45) Date of Patent: Mar. 22, 2016

(54) POROUS MATERIAL, MANUFACTURING METHOD OF THE SAME, AND HONEYCOMB STRUCTURE

(71) Applicant: NGK INSULATORS, LTD., Nagoya (JP)

(72) Inventors: Yunie Izumi, Nagoya (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 139 days.

(21) Appl. No.: 13/849,695

(22) Filed: Mar. 25, 2013

(65) Prior Publication Data

US 2013/0255213 A1 Oct. 3, 2013

(30) Foreign Application Priority Data

Mar. 28, 2012 (JP) ................. 2012-073855

(51) Int. Cl.

| | | |
|---|---|---|
| *B01D 39/14* | (2006.01) | |
| *B01D 39/06* | (2006.01) | |
| *B01D 39/20* | (2006.01) | |
| *B01D 24/00* | (2006.01) | |
| *C04B 35/565* | (2006.01) | |
| *C04B 38/00* | (2006.01) | |
| *C04B 35/636* | (2006.01) | |
| *C04B 111/00* | (2006.01) | |

(52) U.S. Cl.
CPC ............ *B01D 39/14* (2013.01); *B01D 39/2075* (2013.01); *C04B 35/565* (2013.01); *C04B 35/6365* (2013.01); *C04B 38/0006* (2013.01); *B01D 2239/086* (2013.01); *B01D 2239/1208* (2013.01); *C04B 2111/00793* (2013.01); *C04B 2235/3217* (2013.01); *C04B 2235/3218* (2013.01); *C04B 2235/3224* (2013.01); *C04B 2235/3225* (2013.01); *C04B 2235/349* (2013.01); *C04B 2235/3418* (2013.01); *C04B 2235/5436* (2013.01); *C04B 2235/6021* (2013.01); *C04B 2235/663* (2013.01); *C04B 2235/77* (2013.01); *C04B 2235/9607* (2013.01)

(58) Field of Classification Search
CPC ............ C04B 35/565; C01B 38/0006; B01D 39/2075; B01D 46/2429
See application file for complete search history.

(56) References Cited

U.S. PATENT DOCUMENTS

| | | | | |
|---|---|---|---|---|
| 4,595,662 | A * | 6/1986 | Mochida et al. | 501/15 |
| 4,999,137 | A * | 3/1991 | Wapler et al. | 252/516 |
| 5,240,658 | A * | 8/1993 | Lukacs et al. | 264/626 |
| 8,741,210 | B2 * | 6/2014 | Merkel et al. | 264/631 |
| 2002/0042339 | A1 * | 4/2002 | Beall et al. | 501/128 |
| 2002/0044705 | A1 * | 4/2002 | Niwa et al. | 384/492 |
| 2002/0180117 | A1 | 12/2002 | Yamamoto et al. | |
| 2003/0108458 | A1 | 6/2003 | Ichikawa et al. | |
| 2004/0043888 | A1 | 3/2004 | Ando et al. | |
| 2005/0084717 | A1 * | 4/2005 | Tani et al. | 428/698 |
| 2006/0213165 | A1 * | 9/2006 | Isomura et al. | 55/523 |
| 2007/0172632 | A1 * | 7/2007 | Ohno et al. | 428/116 |
| 2008/0010960 | A1 * | 1/2008 | Paisley et al. | 55/523 |
| 2008/0057268 | A1 | 3/2008 | Lu et al. | |
| 2008/0160250 | A1 | 7/2008 | Adler et al. | |
| 2009/0143221 | A1 * | 6/2009 | Ogunwumi et al. | 502/67 |
| 2011/0185690 | A1 | 8/2011 | Jousseaume et al. | |
| 2012/0122660 | A1 * | 5/2012 | Andersen et al. | 502/65 |
| 2012/0135186 | A1 * | 5/2012 | Beall et al. | 428/116 |

FOREIGN PATENT DOCUMENTS

| | | |
|---|---|---|
| JP | 2010-502546 A1 | 1/2010 |
| JP | 4455708 B2 | 4/2010 |
| JP | 2011-520605 A1 | 7/2011 |
| WO | 2008/027423 A2 | 3/2008 |

OTHER PUBLICATIONS

Extended European Search Report dated Jun. 18, 2013.
U.S. Appl. No. 14/196,411, filed Mar. 4, 2014, Izumi, Yunie.
U.S. Appl. No. 14/476,804, filed Sep. 4, 2014, Izumi, Yunie.
U.S. Appl. No. 14/476,813, filed Sep. 4, 2014, Izumi, Yunie.
U.S. Appl. No. 14/478,051, filed Sep. 5, 2014, Ichikawa, Shuichi.

* cited by examiner

*Primary Examiner* — Amber R Orlando

(74) *Attorney, Agent, or Firm* — Burt & Brown, PLLC

(57) ABSTRACT

There are disclosed a porous material having excellent heat resisting properties and an excellent resistance to heat shock. A porous material contains aggregates and an amorphous binding agent to bind the aggregates to one another in a state where pores are formed among the aggregates, the binding agent contains a rare earth element, the amorphous binding agent preferably contains magnesium, aluminum, silicon, the rare earth element and oxygen, and the amorphous binding agent preferably contains 8.0 to 15.0 mass % of MgO, 30.0 to 60.0 mass % of $Al_2O_3$, 30.0 to 55.0 mass % of $SiO_2$, and 1.5 to 10.0 mass % of the rare earth oxide.

10 Claims, No Drawings

US 9,289,707 B2

POROUS MATERIAL, MANUFACTURING METHOD OF THE SAME, AND HONEYCOMB STRUCTURE

The present application is an application based on JP-2012-073855 filed on Mar. 28, 2012 with the Japanese Patent Office, the entire contents of which are incorporated herein by reference.

BACKGROUND OF THE INVENTION

1. Field of the Invention

The present invention relates to a porous material, a manufacturing method of the porous material, and a honeycomb structure, and more particularly, it relates to a porous material having excellent heat resisting properties and an excellent resistance to heat shock, a manufacturing method of the porous material, and a honeycomb structure.

2. Description of Related Art

A porous material in which silicon carbide particles are bound by an oxide phase or the like has an excellent resistance to heat shock, and is therefore used as a material for a catalyst support, a material for a diesel particulate filter (DPF), or the like (e.g., see Patent Documents 1 to 3).

[Patent Document 1] JP-2010-502546-T
[Patent Document 2] JP-2011-520605-T
[Patent Document 3] JP 4455708-B

SUMMARY OF THE INVENTION

Heretofore, a material in which aggregates such as silicon carbide particles are bound by a vitreous phase has been used as a material for a DPF or the like. The vitreous phase has the advantage that low temperature firing is possible in a firing step of a manufacturing method. However, further enhancement has been required from the viewpoints of heat resisting properties and a resistance to heat shock.

The present invention has been developed to solve such a problem, and a main object thereof is to provide a porous material having excellent heat resisting properties and an excellent resistance to heat shock, and a honeycomb structure.

To achieve the above-mentioned object, according to the present invention, there are provided a porous material, a manufacturing method of the porous material, and a honeycomb structure as follows.

[1] A porous material which contains aggregates, and an amorphous binding agent to bind the aggregates to one another in a state where pores are formed among the aggregates, wherein the binding agent contains a rare earth element.

[2] The porous material according to the above [1], wherein the amorphous binding agent contains magnesium, aluminum, silicon, the rare earth element, and oxygen.

[3] The porous material according to the above [1] or [2], wherein a content of a rare earth oxide in the binding agent is from 1.5 to 10.0 mass % of the whole binding agent.

[4] The porous material according to any one of the above [1] to [3], wherein the binding agent contains 8.0 to 15.0 mass % of MgO, 30.0 to 60.0 mass % of $Al_2O_3$, 30.0 to 55.0 mass % of $SiO_2$, and 1.5 to 10.0 mass % of the rare earth oxide in the whole binding agent.

[5] The porous material according to any one of the above [1] to [4], wherein the rare earth element is at least one selected from the group consisting of yttrium, lanthanum, cerium, praseodymium, neodymium, samarium, europium, gadolinium, terbium, dysprosium, holmium, erbium, thulium, ytterbium and lutetium.

[6] The porous material according to any one of the above [1] to [5], wherein a ratio of a mass of the binding agent to a total mass of the aggregates and the binding agent is from 7 to 45 mass %.

[7] The porous material according to any one of the above [1] to [6], wherein the aggregates are silicon carbide particles or silicon nitride particles.

[8] The porous material according to any one of the above [1] to [7], wherein a porosity is from 52 to 70%.

[9] The porous material according to any one of the above [1] to [8], wherein a bending strength is 10 MPa or more, and a bending strength/Young's modulus ratio is $1.7 \times 10^{-3}$ or more.

[10] The porous material according to any one of the above [1] to [9], wherein a coefficient of thermal expansion is $4.3 \times 10^{-6}$/K or less.

[11] A manufacturing method of a porous material, including: firing a raw material for the porous material which contains aggregate powder and a raw material for a binding agent including a rare earth element, at 1400 to 1480° C. to prepare the porous material.

[12] A honeycomb structure comprising partition walls which are constituted of the porous material according to any one of the above [1] to [10] and with which a plurality of cells extending from one end surface to the other end surface are formed.

[13] The honeycomb structure according to the above [12], comprising plugged portions arranged in open frontal areas of the predetermined cells in the one end surface and open frontal areas of the remaining cells in the other end surface.

A porous material of the present invention has excellent heat resisting properties and an excellent resistance to heat shock, as compared with a conventional porous material.

DETAILED DESCRIPTION OF THE INVENTION

Hereinafter, embodiments of the present invention will specifically be described. The present invention is not limited to the following embodiments. It should be understood that suitable modifications, improvements and the like added to the following embodiments on the basis of ordinary knowledge of a person skilled in the art without departing from the gist of the present invention also fall in the scope of the present invention.

(1) Porous Material:

An embodiment of a porous material of the present invention contains aggregates, and an amorphous binding agent to bind the aggregates to one another in a state where pores are formed among the aggregates, and the binding agent contains a rare earth element.

In the porous material of the present embodiment, since the amorphous binding agent contains the rare earth element as described above, the porous material has excellent heat resisting properties. Moreover, in the porous material of the present embodiment, since the binding agent is amorphous, firing can be performed at a low temperature in a firing step of a manufacturing method. Therefore, the porous material of the present embodiment can be prepared by performing the firing at the low temperature, and has the excellent heat resisting properties. Furthermore, the porous material of the present embodiment can be fired at the low temperature as well as a high temperature. Therefore, the porous material of the present embodiment can be fired in a broad temperature range in the firing step of the manufacturing method. Additionally, the porous material of the present embodiment has a high bending strength, and a high value of "bending strength/ Young's modulus ratio". In consequence, the porous material of the present embodiment has an excellent resistance to heat shock.

In the porous material of the present embodiment, as described above, the aggregates are bound by the binding agent so that the pores are formed among the aggregates. Moreover, the binding agent is amorphous, and contains the rare earth element.

In the porous material of the present embodiment, examples of the aggregates include silicon carbide (SiC) particles, silicon nitride ($Si_3N_4$) particles, mullite ($Al_6Si_2O_{13}$) particles, and alumina ($Al_2O_3$) particles. Among these aggregates, the silicon carbide (SiC) particles or the silicon nitride ($Si_3N_4$) particles are preferable, and the silicon carbide (SiC) particles are further preferable.

In the porous material of the present embodiment, the amorphous binding agent to bind the aggregates to one another contains the rare earth element. A content of a rare earth oxide in the binding agent is preferably from 1.5 to 10.0 mass % of the whole binding agent. Moreover, the amorphous binding agent preferably contains magnesium, aluminum, silicon, the rare earth element and oxygen. Furthermore, the binding agent preferably contains 8.0 to 15.0 mass % of MgO, 30.0 to 60.0 mass % of $Al_2O_3$, 30.0 to 55.0 mass % of $SiO_2$, and 1.5 to 10.0 mass % of the rare earth oxide in the whole binding agent. Additionally, the amorphous binding agent further preferably contains 1.5 to 6.5 mass % of the rare earth oxide. Since the amorphous binding agent has the above composition, the firing can be performed at the low temperature in the firing step of the manufacturing method of the porous material, and the porous material has high heat resisting properties. In particular, when the content of the rare earth element is in the above range, the heat resisting properties of the porous material can effectively be enhanced. When the content of the rare earth oxide is smaller than 1.5 mass %, a strength deteriorates due to insufficient firing, and the effect of enhancing the heat resisting properties decreases sometimes in the firing step of the preparation of the porous material. When the content is larger than 10.0 mass %, a coefficient of thermal expansion increases, and the resistance to heat shock deteriorates sometimes. The content (mass %) of each component in "the amorphous binding agent" is determined by a method of inductively coupled plasma atomic emission spectrometry (ICP-AES). Specifically, amounts of silicon (Si), aluminum (Al), magnesium (Mg), the rare earth, carbon (C) and oxygen (O) are measured. Then, an amount of silicon carbide (SiC) is calculated from the amount of carbon (C). Moreover, the remaining silicon (Si) (which is not included in silicon carbide (SiC)) is regarded as silicon dioxide ($SiO_2$), and an amount of the silicon dioxide ($SiO_2$) is calculated. Furthermore, aluminum (Al), magnesium (Mg) and the rare earth are regarded as oxides, and amounts of the oxides are calculated, respectively. Additionally, contents of the respective components ($SiO_2$, $Al_2O_3$, MgO and the rare earth oxide) in "the amorphous binding agent" to the whole content of $SiO_2$, $Al_2O_3$, MgO and the rare earth oxide are determined. Moreover, a total mass of $SiO_2$, $Al_2O_3$, MgO and the rare earth oxide is a mass of "the amorphous binding agent".

The rare earth element is preferably at least one selected from the group consisting of yttrium, lanthanum, cerium, praseodymium, neodymium, samarium, europium, gadolinium, terbium, dysprosium, holmium, erbium, thulium, ytterbium and lutetium. Moreover, the rare earth element is further preferably yttrium, lanthanum, cerium, neodymium or gadolinium, and is especially preferably yttrium. When the rare earth element is yttrium, the rare earth oxide is yttrium oxide ($Y_2O_3$).

In the porous material of the present embodiment, the amorphous binding agent binds the aggregates to one another in the state where the pores are formed among the aggregates.

In the porous material of the present embodiment, a porosity is preferably from 40 to 90%, and further preferably from 52 to 70%. When the porosity is smaller than 40%, a pressure loss increases sometimes. Moreover, when the porosity is in excess of 90%, the strength deteriorates sometimes. In the present description, the porosity is a value calculated from a total pore volume (unit: $cm^3/g$) by mercury porosimetry (in conformity to JIS R 1655) and an apparent density (unit: $cm^3/g$) by an underwater Archimedes method. To calculate the porosity, an equation "the porosity [%]=the total pore volume/{(1/the apparent density)+the total pore volume}× 100" is used. Additionally, the porosity can be regulated, for example, in accordance with an amount of a pore former for use in manufacturing the porous material, an amount of an auxiliary sintering agent, a firing atmosphere and the like. Moreover, the porosity can be regulated in accordance with a ratio between the aggregates and the binding agent.

In the porous material of the present embodiment, an average pore diameter is preferably from 10 to 40 and further preferably from 15 to 30 μm. When the average pore diameter is smaller than 10 μm, the pressure loss increases sometimes. When the average pore diameter is in excess of 40 μm and the porous material of the present embodiment is used as a DPF or the like, a part of a particulate matter in an exhaust gas is not collected, and passes through the DPF or the like sometimes. In the present description, the average pore diameter is a value measured by the mercury porosimetry (in conformity to JIS R 1655).

In the porous material of the present embodiment, the pores having pore diameters smaller than 10 μm are preferably 20% or less of all the pores, and the pores having pore diameters in excess of 40 μm are preferably 10% or less of all the pores. When the pores having the pore diameters smaller than 10 μm are in excess of 20% of all the pores, the pores having the pore diameters smaller than 10 μm are easily clogged with a catalyst at loading of the catalyst, and hence the pressure loss easily increases sometimes. When the pores having pore diameters larger than 40 μm are in excess of 10% of all the pores, the particulate matter easily passes through the pores having the pore diameters larger than 40 μm, and hence a filter function of the DPF or the like is not easily exerted.

In the porous material of the present embodiment, a ratio of a mass of the binding agent to a total mass of the contained aggregates and binding agent is preferably from 7 to 45 mass %. Furthermore, the ratio of the mass of the binding agent to the total mass of the aggregates and the binding agent is further preferably from 10 to 35 mass %, and especially preferably from 15 to 30 mass %. When the ratio of the mass of the binding agent to the total mass of the contained aggregates and binding agent is smaller than 7 mass %, the bending strength deteriorates, further "the strength/Young's modulus ratio" decreases, and the resistance to heat shock deteriorates sometimes. When the ratio of the mass of the binding agent to the total mass of the contained aggregates and binding agent is in excess of 45 mass %, the porosity decreases sometimes. As an amount of the aggregates and an amount of the binding agent, values measured by the ICP-AES method are used. Specifically, the amount of silicon carbide (the aggregates) and the amount of "the amorphous binding agent" are preferably determined similarly to the above "determination of the content (mass %) of each component in "the amorphous binding agent"".

In the porous material of the present embodiment, an average particle diameter of the aggregates is preferably from 5 to 100 μm, and further preferably from 10 to 40 μm. When the average particle diameter is smaller than 5 μm, a firing shrinkage amount increases, and a porosity of a fired body is smaller than 40% sometimes. Moreover, in the fired body, the pores smaller than 10 μm are in excess of 20% of all the pores sometimes. When the average particle diameter is larger than 100 μm, the pores in excess of 40 μm in the fired body are in excess of 10% of all the pores sometimes. Furthermore, when a honeycomb structure is formed, the clogging of a die is caused, thereby resulting in a forming defect.

In the porous material of the present embodiment, the bending strength is preferably 10 MPa or more, and "the bending strength (Pa)/Young's modulus (Pa) ratio" is preferably $1.7 \times 10^{-3}$ or more. When the bending strength and "the bending strength (Pa)/Young's modulus (Pa) ratio" are in the above ranges, the resistance to heat shock of the porous material can be enhanced. When the bending strength is smaller than 10 MPa, the resistance to heat shock unfavorably deteriorates. Additionally, the higher bending strength is more preferable, but due to a constitution of the porous material of the present embodiment, about 50 MPa is an upper limit. In the present description, the bending strength is a value measured by "a bending test" in conformity to JIS R1601. Moreover, in the present description, the Young's modulus is a value calculated from "a stress-strain curve" obtained in the above-mentioned "bending test".

In the porous material of the present embodiment, a coefficient of linear thermal expansion at 40 to 800° C. is preferably $4.2 \times 10^{-6}$/K or less. Moreover, the coefficient of linear thermal expansion at 40 to 800° C. is further preferably from $2.0 \times 10^{-6}$/K or more and $4.2 \times 10^{-6}$/K or less, and especially preferably from $2.0 \times 10^{-6}$/K or more and $3.9 \times 10^{-6}$/K or less. When the coefficient is larger than $4.2 \times 10^{-6}$/K, the resistance to heat shock deteriorates sometimes. Additionally, the smaller coefficient of linear thermal expansion is more preferable, but due to the constitution of the present invention, $2.0 \times 10^{-6}$/K is a lower limit. In the present description, the coefficient of thermal expansion is a value measured by a method in conformity to JIS R1618. Specifically, a test piece of vertical 3 cells×horizontal 3 cells×a length of 20 mm is cut from the honeycomb structure, and the coefficient of thermal expansion at 40 to 800° C. in an A-axis direction (a parallel direction to through channels of the honeycomb structure) is measured.

(2) Honeycomb Structure

An embodiment of the honeycomb structure of the present invention includes partition walls which are constituted of the above-mentioned embodiment of the porous material of the present invention and with which "a plurality of cells extending from one end surface to the other end surface" are formed. The cells become the through channels of a fluid. Moreover, the honeycomb structure is preferably a structure having an outer peripheral wall positioned in the outermost periphery. A thickness of each of the partition walls is preferably from 30 to 1000 μm, further preferably from 50 to 500 μm, and especially preferably from 50 to 350 μm. A cell density is preferably from 10 to 200 cells/cm², further preferably from 20 to 200 cells/cm², and especially preferably from 50 to 150 cells/cm².

There is not any special restriction on a shape of the honeycomb structure, and examples of the shape include a cylindrical shape, and a tubular shape in which a bottom surface has a polygonal shape (a triangular, quadrangular, pentangular or hexagonal shape).

There is not any special restriction on a cell shape of the honeycomb structure, and examples of the cell shape in a cross section perpendicular to a cell extending direction include polygonal shapes (triangular, quadrangular, pentangular, hexagonal, heptagonal and octagonal shapes), a circular shape, and combinations of these shapes.

A size of the honeycomb structure can suitably be determined in accordance with a use application. The honeycomb structure of the present invention is constituted of a porous base material of the present invention, and hence the structure has excellent heat resisting properties and resistance to heat shock. Therefore, a size of the honeycomb structure can be increased. Moreover, the size of the honeycomb structure is, for example, from about 10 cm³ to $2.0 \times 10^4$ cm³.

The honeycomb structure of the present invention can be used as the DPF or a catalyst support. Moreover, a catalyst is preferably loaded onto the DPF. When the honeycomb structure of the present invention is used as the DPF or the like, the following structure is preferable. That is, the honeycomb structure of the present invention preferably includes plugged portions arranged in open frontal areas of the predetermined cells in the one end surface and open frontal areas of the remaining cells in the other end surface. In both the end surfaces, the cells having the plugged portions and the cells which do not have the plugged portions are preferably alternately arranged to form a checkered pattern.

(3) Manufacturing Method of Porous Material:

Hereinafter, an embodiment of a manufacturing method of the porous material of the present invention will be described.

The manufacturing method of the porous material of the present embodiment is a method of firing a raw material for the porous material which contains aggregate powder and a raw material for a binding agent including a rare earth element, at 1400 to 1480° C. to prepare the porous material. In the manufacturing method of the porous material of the present embodiment, since the rare earth element is contained in the raw material for the binding agent, the firing can be performed in a broad temperature range of 1400 to 1480° C. In consequence, for example, even when a temperature distribution is generated in a firing furnace, the firing does not become insufficient, and the suitably fired porous material can be obtained. Furthermore, in the manufacturing method of the porous material of the present embodiment, since the raw material for the binding agent contains the rare earth element, the obtained porous material has the excellent heat resisting properties and resistance to heat shock. Additionally, when "the raw material for the porous material is fired", there are included a case where the raw material for the porous material is dried and then fired, and a case where the raw material for the porous material is dried, degreased and then fired.

In the manufacturing method of the porous material of the present embodiment, first, the aggregate powder and the raw material for the binding agent including the rare earth element are mixed, and if necessary, a binder, a surfactant, a pore former, water or the like is added, to prepare the raw material for the porous material.

The raw material for the binding agent is fired to become the amorphous binding agent. The raw material for the binding agent preferably contains magnesium, aluminum, silicon, the rare earth element and oxygen. There is not any special restriction on a raw material which becomes a magnesium source, a raw material which becomes an aluminum source, a raw material which becomes a silicon source or a raw material which becomes a rare earth element source, but each raw material is preferably a powder-like raw material including oxygen. An example of the raw material powder which becomes the aluminum source is aluminum hydroxide powder. Moreover, an example of the raw material powder which becomes the magnesium source is talc powder. Moreover, examples of the raw material powder which becomes the silicon source include silica powder, and talc powder. Furthermore, an example of the raw material powder which becomes the rare earth source is rare earth oxide powder. Additionally, as the raw material for the binding agent, mixed powder including the aluminum hydroxide powder, the talc powder, the silica powder and the rare earth oxide powder is preferable.

In the raw material for the binding agent, contents (the content ratios) of magnesium, aluminum, silicon and the rare earth element are preferably the following values, respectively. Additionally, the following contents (the content ratios) of magnesium, aluminum, silicon and the rare earth element are the content ratios (mass %) in terms of masses of MgO, $Al_2O_3$, $SiO_2$ and the rare earth oxide. For example, the content ratio in terms of MgO is the content ratio (mass %) of the MgO, if all magnesium is present as the MgO. The raw material for the binding agent preferably contains 8.0 to 15.0 mass % of magnesium in terms of MgO. Moreover, the raw material preferably contains 30.0 to 60.0 mass % of aluminum in terms of $Al_2O_3$. Furthermore, the raw material preferably contains 30.0 to 55.0 mass % of silicon in terms of $SiO_2$. Additionally, the raw material preferably contains 1.5 to 10.0 mass % of the rare earth element in terms of the rare earth oxide. Moreover, the raw material for the binding agent preferably contains the above raw material powders so that the contents of magnesium, aluminum, silicon and the rare earth element are in the above ranges.

The rare earth element is preferably at least one selected from the group consisting of yttrium, lanthanum, cerium, praseodymium, neodymium, samarium, europium, gadolinium, terbium, dysprosium, holmium, erbium, thulium, ytterbium and lutetium. Moreover, as the rare earth element, yttrium is preferable. When the rare earth element is yttrium, the rare earth oxide is yttrium oxide ($Y_2O_3$).

Examples of the aggregate powder include silicon carbide (SiC) powder, silicon nitride ($Si_3N_4$) powder, mullite ($Al_6Si_2O_{13}$), and alumina ($Al_2O_3$). Among these powders, the silicon carbide (SiC) powder and the silicon nitride ($Si_3N_4$) powder are preferable, and the silicon carbide (SiC) powder is further preferable.

An average particle diameter of the aggregate powder is preferably from 5 to 100 μm, and further preferably from 10 to 40 μm. The average particle diameter is a value measured by a laser diffraction method.

The raw material for the porous material preferably contains 7 to 45 mass % of the raw material for the binding agent to the total mass of the aggregate powder and the raw material for the binding agent. Moreover, the raw material for the porous material contains further preferably 10 to 35 mass %, and especially preferably 15 to 30 mass % of the raw material for the binding agent to the total mass of the aggregate powder and the raw material for the binding agent. When the content of the raw material for the binding agent is smaller than 7 mass %, the bending strength of the obtained porous material decreases, further "the strength/Young's modulus ratio" decreases, and the resistance to heat shock deteriorates sometimes. When the content of the whole raw material for the binding agent is in excess of 45 mass %, the porosity of the obtained porous material decreases sometimes.

Examples of the binder include organic binders such as methylcellulose, hydroxypropoxyl cellulose, hydroxyethyl cellulose, hydroxypropyl methylcellulose, carboxymethylcellulose, and polyvinyl alcohol. An content of the binder is preferably from 2 to 10 mass % of the whole raw material for the porous material.

As the surfactant, ethylene glycol, dextrin, fatty acid soap, polyalcohol or the like can be used. One of these surfactants may be used alone, or a combination of two or more of the surfactants may be used. A content of the surfactant is preferably 2 mass % or less of the whole raw material for the porous material.

There is not any special restriction on the pore former, as long as the pores are formed after the firing, and examples of the pore former include graphite, starch, resin balloons, a water-absorbing resin, and silica gel. One of these pore formers may be used alone, or a combination of two or more of the pore formers may be used. A content of the pore former is preferably 20 mass % or less of the whole raw material for the porous material. An average particle diameter of the pore former is preferably from 10 to 50 μl. When the average particle diameter is smaller than 10 μm, the pores cannot sufficiently be formed sometimes. When the average particle diameter is larger than 50 μm and, for example, the raw material for the porous material is formed into a honeycomb shape and then fired (when the honeycomb structure is prepared), the die is clogged sometimes at the formation. The average particle diameter of the pore former is a value measured by the laser diffraction method. Additionally, when the pore former is the water-absorbing resin, the average particle diameter is a value after water absorption.

A content of the water is preferably from 20 to 80 mass % of the whole raw material for the porous material. For example, when the porous material is formed into the honeycomb shape and then fired (when the honeycomb structure is prepared), the content of the water is preferably suitably regulated so that hardness of the porous material at the formation into the honeycomb shape (the hardness of a kneaded material) is such a hardness that the shape is easily formed.

Next, the raw material for the porous material is preferably formed into a desirable shape. There is not any special restriction on the shape to be formed or a forming method, and the shape or the method can suitably be determined in accordance with the use application.

Next, the raw material for the porous material (a formed body obtained when the raw material for the porous material is formed into a specific shape) is preferably dried. There is not any special restriction on a drying method, and examples of the method include electromagnetic heating methods such as microwave heating drying and high frequency dielectric heating drying, and external heating methods such as hot air drying and superheat steam drying. In these methods, a predetermined amount of water is preferably dried by the electromagnetic heating method, and then the remaining water is dried by the external heating method, because the whole formed body can rapidly and uniformly be dried so that any cracks are not generated. As drying conditions, 30 to 99 mass % of the water to the amount of the water prior to the drying is removed by the electromagnetic heating method, and then the amount is decreased to 3 mass % or less of the water by the external heating method. As the electromagnetic heating method, the dielectric heating drying is preferable, and as the external heating method, the hot air drying is preferable.

Next, the raw material for the porous material (the dried raw material for the porous material, when the drying is performed) is fired, to prepare the porous material. Prior to the firing (main firing), calcinating (degreasing) is preferably performed to remove the binder and the like. The calcinating is preferably performed in the atmospheric air at 200 to 600° C. for 0.5 to 20 hours. A firing temperature is from 1400 to 1480° C. In the manufacturing method of the porous material of the present embodiment, since the raw material for the binding agent contains the rare earth element, the raw material can be fired in a broad temperature range of 1400 to 1480° C. In consequence, for example, even when the temperature distribution is generated in the firing furnace, insufficient firing does not take place, and the suitably fired porous material can be obtained. Moreover, in the manufacturing method of the porous material of the present embodiment, since the raw material for the binding agent contains the rare earth element, the obtained porous material has the excellent heat resisting properties and resistance to heat shock.

The atmosphere at the firing is preferably non-oxidizing atmosphere of nitrogen, argon or the like (an oxygen partial pressure is $10^{-4}$ atm or less). Moreover, the firing is preferably performed at ordinary pressure. Furthermore, a firing time is preferably from one to 20 hours. Additionally, the calcinating and firing can be performed by using, for example, an electric furnace or a gas furnace.

According to the embodiment of the manufacturing method of the porous material of the present invention, the embodiment of the porous material of the present invention can be obtained.

(4) Manufacturing Method of Honeycomb Structure:

The manufacturing method of the embodiment of the honeycomb structure of the present invention will be described.

The manufacturing method of the embodiment of the honeycomb structure of the present invention described hereinafter is a method of forming the raw material for the porous material into the honeycomb shape and then firing the raw material to obtain the honeycomb porous material (the honeycomb structure) in the above embodiment of "the manufacturing method of the porous material" of the present invention. Therefore, it can be considered that the manufacturing method of the embodiment of the honeycomb structure of the invention is a configuration of the above manufacturing method of the porous material of the present invention.

In the manufacturing method of the embodiment of the honeycomb structure of the present invention, first, the raw material for the porous material is preferably prepared by a method similar to the above embodiment of "the manufacturing method of the porous material" of the present invention.

Then, the obtained raw material for the porous material is kneaded to form the kneaded material. There is not any special restriction on the method of kneading the raw material for the porous material to form the kneaded material, and an example of the method is a method using a kneader, a vacuum clay kneader or the like.

Next, the kneaded material is extruded to obtain a formed honeycomb body (the raw material for the porous material having the honeycomb shape). The extrusion-forming is preferably performed by using a die having desirable entire shape, cell shape, partition wall thickness and cell density. As a material of the die, a hard metal which does not easily wear down is preferable. The formed honeycomb body has porous partition walls with which a plurality of cells are formed to become through channels of a fluid, and an outer peripheral wall positioned in the outermost periphery. The partition wall thickness, cell density, outer peripheral wall thickness and the like of the formed honeycomb body can suitably be determined in accordance with the honeycomb structure to be prepared, in consideration of shrinkages in the drying and firing.

The formed honeycomb body obtained in this way is preferably dried prior to the firing. There is not any special restriction on a drying method, and examples of the method include electromagnetic heating methods such as microwave heating drying and high frequency dielectric heating drying, and external heating methods such as hot air drying and superheat steam drying. In these methods, a predetermined amount of water is preferably dried by the electromagnetic heating method, and then the remaining water is dried by the external heating method, because the whole formed body can rapidly and uniformly be dried so that any cracks are not generated. As drying conditions, 30 to 99 mass % of the water to the amount of the water prior to the drying is removed by the electromagnetic heating method and then the amount is decreased to 3 mass % or less of the water by the external heating method. As the electromagnetic heating method, the dielectric heating drying is preferable, and as the external heating method, the hot air drying is preferable.

Next, when a length of the formed honeycomb body in the cell extending direction is not a desirable length, both end surfaces (both the ends) are preferably cut into the desirable length. There is not any special restriction on a cutting method, but an example of the method is a method using a disc saw cutter or the like.

Next, the formed honeycomb body is fired, to prepare the honeycomb structure. Prior to the firing, calcinating is preferably performed to remove the binder and the like. As calcinating conditions, the calcinating is preferably performed in the atmospheric air at 200 to 600° C. for 0.5 to 20 hours. A firing temperature is from 1400 to 1480° C. In the manufacturing method of the embodiment of the honeycomb structure of the present invention, since the raw material for the binding agent contains the rare earth element, the firing can be performed in a broad temperature range of 1400 to 1480° C. In consequence, for example, even when the temperature distribution is generated in the firing furnace, insufficient firing does not take place, and the suitably fired honeycomb structure can be obtained. Moreover, a product yield is thus enhanced. Furthermore, in the manufacturing method of the embodiment of the honeycomb structure of the present invention, since the raw material for the binding agent contains the rare earth element, the obtained honeycomb structure has the excellent heat resisting properties and resistance to heat shock.

The atmosphere at the firing is preferably non-oxidizing atmosphere of nitrogen, argon or the like (an oxygen partial pressure is $10^{-4}$ atm or less). Moreover, the firing is preferably performed at ordinary pressure. Furthermore, a firing time is preferably from one to 20 hours. Further after the firing, an oxidizing treatment is preferably performed in the atmospheric air (may include steam) at 1100 to 1400° C. for one to 20 hours, to enhance a durability. Additionally, the calcinating and firing can be performed by using, for example, an electric furnace or a gas furnace.

EXAMPLES

Hereinafter, examples of the present invention will further specifically be described, but the present invention is not limited to these examples.

Example 1

Silicon carbide (SiC) powder and a raw material (powder) for a binding agent were mixed at a ratio (the mass ratio) of 72.8:27.2 to prepare "the mixed powder". As the raw material for the binding agent, there was used powder containing 52.2 mass % of aluminum hydroxide, 26.5 mass % of talc, 19.8 mass % of silica, and 1.5 mass % of yttrium oxide ($Y_2O_3$). Then, to the above "mixed powder", hydroxypropyl methylcellulose was added as a binder, starch and a water-absorbing resin were added as a pore former, and water was added, to obtain a raw material for a porous material (the forming raw material). A content of the binder was 7 parts by mass to 100 parts by mass of the mixed powder. A content of the pore former was 12 parts by mass to 100 parts by mass of the mixed powder. A content of the water was 70 parts by mass to 100 parts by mass of the mixed powder. An average particle diameter of the silicon carbide powder was 20 μm. Moreover, as an average particle diameter of the pore former, both the starch and the water-absorbing resin had an average particle diameter of 30 μm. Additionally, the average particle diameters of the silicon carbide powder and the pore former were values measured by a laser diffraction method.

Next, the forming raw material was mixed and kneaded to prepare a columnar kneaded material. Then, the obtained columnar kneaded material was formed into a honeycomb shape by use of an extruder, to obtain a formed honeycomb body (a raw material for a porous material which was formed into the honeycomb shape). The obtained formed honeycomb body was dielectrically heated and dried, and then dried by using a hot air drier at 120° C. for two hours, to obtain the dried honeycomb body.

The obtained dried honeycomb body was degreased in the atmospheric air at 550° C. for three hours, and then fired in an Ar inert atmosphere at about 1450° C. for two hours, to obtain the fired honeycomb body. Then, the obtained fired honeycomb body was subjected to an oxidation treatment at 1200° C. for four hours to obtain the honeycomb porous material (a honeycomb structure). Additionally, it can be considered that the above fired honeycomb body is also the porous material.

In the obtained honeycomb structure, a thickness of each of partition walls was 300 μm, and a cell density was 46.5 (cells/cm$^2$). Moreover, a bottom surface of the honeycomb structure had a quadrangular shape with each side of 35 mm, and a length of the honeycomb structure in a cell extending direction was 50 mm.

Silicon carbide, MgO, $Al_2O_3$, $SiO_2$ and $Y_2O_3$ which were contained in the honeycomb structure (the porous material) were identified by a method described later (the identification of the respective components). In consequence, it was confirmed that the honeycomb structure included silicon carbide, MgO, $Al_2O_3$, $SiO_2$ and $Y_2O_3$. A content of MgO in a binding agent was 10.6 mass %. Moreover, a content of $Al_2O_3$ in the binding agent was 42.4 mass %. Furthermore, a content of $SiO_2$ in the binding agent was 45.3 mass %. Additionally, a content of $Y_2O_3$ in the binding agent was 1.7 mass %. Moreover, a ratio of a mass of silicon carbide to a total mass of silicon carbide and the binding agent was 76.8 mass %, and a ratio of the mass of the binding agent was 23.2 mass %.

A porosity of the obtained honeycomb porous material (the honeycomb structure) was 61.0%, an average pore diameter was 16.1 and a pore volume was 0.510 cm$^3$/g. Moreover, a bending strength of the honeycomb structure was 15.0 MPa, a Young's modulus was 7.8 GPa, and "a strength/Young's modulus ratio" was $1.9 \times 10^{-3}$. Additionally, "the strength" of "the strength/Young's modulus ratio" was "the bending strength". Moreover, a coefficient of thermal expansion (at 40 to 800° C.) of the honeycomb structure was $4.2 \times 10^{-6} K^{-1}$ (described as "4.2 ppm/K" in Table 1). The obtained results are shown in Table 1. Additionally, the respective measured values were values obtained by the following methods.

In Table 1, a column of "$Y_2O_3$ amount" indicates a mass ratio (mass %) of $Y_2O_3$ to a total mass of the binding agent. Moreover, columns of "porosity", "average pore diameter" and "pore volume" indicate the porosity, average pore diameter and pore volume of the porous material. Furthermore, columns of "bending strength", "Young's modulus" and "coefficient of thermal expansion" indicate the bending strength, Young's modulus and coefficient of thermal expansion of the porous material. Additionally, a column of "strength/Young's modulus ratio" indicates a value obtained by dividing the bending strength (Pa) by the Young's modulus (Pa).

Moreover, in a column of "general evaluation" of Table 1, "excellent" indicates an optimum result, "good" indicates a suitable result, "acceptable" indicates a passable result, and "bad" indicates an unsuitable result. Specifically, a bending strength of 6.0 MPa or more, a strength/Young's modulus ratio of 1.7 or more and a coefficient of thermal expansion of 4.3 ppm/K or less are "excellent(optimum)". Moreover, a bending strength of 6.0 MPa or more, a strength/Young's modulus ratio of 1.6 to 1.7 and a coefficient of thermal expansion of 4.3 to 4.5 ppm/K are "good(suitable)". Furthermore, a bending strength of 6.0 MPa or more, a strength/Young's modulus ratio of 1.6 to 1.7 and a coefficient of thermal expansion of 4.5 ppm/K or more are "acceptable(passable)". Additionally, a bending strength smaller than 6.0 MPa and a strength/Young's modulus ratio smaller than 1.7 are "bad (unsuitable)".

(Identification of Components)

The identification of the respective components of the porous material was performed together with identification of a constituent phase by powder X-ray diffraction as well as qualitative analysis with an electron probe micro analyzer (EPMA) and an element mapping result. Contents of the components were determined by a method of inductively coupled plasma atomic emission spectrometry (ICP-AES). Specifically, amounts of silicon (Si), aluminum (Al), magnesium (Mg), a rare earth, carbon (C) and oxygen (O) were measured. Then, an amount of silicon carbide (SiC) was calculated from an amount of carbon (C). Moreover, the remaining silicon (Si) (which was not included in silicon carbide (SiC)) was regarded as silicon dioxide ($SiO_2$), and an amount of the silicon dioxide ($SiO_2$) was calculated. Then, as the amounts of aluminum (Al), magnesium (Mg) and the rare earth, amounts of oxides were calculated. Next, contents of components ($SiO_2$, $Al_2O_3$, MgO and the rare earth oxide) in "an amorphous binding agent" to a total content of the above $SiO_2$, $Al_2O_3$. MgO and the rare earth oxide were calculated.

(Porosity)

The porosity was calculated from a total pore volume [cm$^3$/g] by mercury porosimetry (in conformity to JIS R 1655) and an apparent density [g/cm$^3$] by an underwater Archimedes method. In the calculation of the porosity, an equation "the open porosity (%)=100× the total pore volume/{(1/the apparent density)+the total pore volume}" was used. Additionally, "the porosity" mentioned in the present description is "the open porosity". The open porosity is the porosity of "pores which are open in the surface of the porous material".

(Average Pore Diameter)

The average pore diameter was measured by the mercury porosimetry (in conformity to JIS R 1655).

(Pore Volume)

The pore volume was measured by the mercury porosimetry (in conformity to JIS R 1655).

(Bending Strength (Strength))

The honeycomb structure was processed into a test piece (a thickness of 0.3 mm×a width of 4 mm×a length of 40 mm) having a cell extending direction as a longitudinal direction, and a bending strength of a material was calculated by "a bending test" in conformity to JIS R1601.

(Young's Modulus)

A "tilt" was calculated from "a stress-strain curve" obtained by the above "bending strength" test, and "the tilt" was obtained as the Young's modulus.

(Coefficient of Thermal Expansion)

An average coefficient of linear thermal expansion (the coefficient of thermal expansion) at 40 to 800° C. was measured in conformity to JIS R1618.

TABLE 1

| | Aggregates Type of aggregates | Ratio between aggregates and binding agent | | Binding agent composition | | | | | Firing temp. ° C. |
|---|---|---|---|---|---|---|---|---|---|
| | | Aggregates Mass % | Binding agent Mass % | MgO Mass % | $Al_2O_3$ Mass % | $SiO_2$ Mass % | Amount of $Y_2O_3$ Mass % | $Yb_2O_3$ Mass % | |
| Example 1 | SiC | 76.8 | 23.2 | 10.6 | 42.4 | 45.3 | 1.7 | — | 1450 |
| Example 2 | SiC | 76.5 | 23.5 | 10.4 | 41.7 | 44.6 | 3.3 | | |
| Example 3 | SiC | 75.9 | 24.1 | 10.1 | 40.4 | 43.2 | 6.3 | | |
| Example 4 | SiC | 76.8 | 23.2 | 10.6 | 42.4 | 45.3 | 1.7 | | 1400 |
| Example 5 | SiC | 75.9 | 24.1 | 10.1 | 40.4 | 43.2 | 6.3 | | |
| Example 6 | SiC | 75.9 | 24.1 | 10.1 | 40.4 | 43.2 | 6.3 | | 1430 |
| Example 7 | SiC | 75.6 | 24.4 | 9.9 | 39.7 | 42.6 | 7.8 | | 1400 |
| Example 8 | SiC | 74.8 | 25.2 | 9.4 | 37.7 | 40.4 | 12.5 | | 1400 |
| Example 9 | SiC | 91.3 | 8.7 | 13.5 | 31.0 | 53.5 | 2.0 | | 1430 |
| Example 10 | SiC | 64.2 | 35.8 | 7.1 | 57.4 | 32.1 | 3.4 | | 1430 |
| Example 11 | SiC | 75.9 | 24.1 | 10.1 | 40.4 | 43.2 | — | 6.3 | 1430 |
| Example 12 | $Si_3N_4$ | 75.1 | 24.9 | 10.4 | 41.7 | 44.6 | 3.3 | — | 1430 |
| Comparative Example 1 | SiC | 77.1 | 22.9 | 10.8 | 43.1 | 46.1 | 0.0 | | 1400 |
| Comparative Example 2 | SiC | 77.1 | 22.9 | 10.8 | 43.1 | 46.1 | 0.0 | | 1450 |

| | Property values of porous material | | | | | | | |
|---|---|---|---|---|---|---|---|---|
| | Porosity % | Ave. pore dia. μm | Total pore volume cm³/g | Bending strength Mpa | Young's modulus Gpa | Strength/ Young's modulus ($\times 10^{-3}$) | Thermal expansion coefficient ppm/K | General evaluation |
| Example 1 | 61.0 | 16.1 | 0.510 | 15.0 | 7.8 | 1.9 | 4.2 | excellent |
| Example 2 | 60.7 | 16.3 | 0.504 | 16.0 | 9.5 | 1.7 | 4.3 | excellent |
| Example 3 | 60.9 | 16.6 | 0.505 | 19.2 | 9.8 | 2.0 | 4.1 | excellent |
| Example 4 | 63.0 | 11.6 | 0.528 | 6.5 | 3.6 | 1.8 | 4.2 | excellent |
| Example 5 | 60.3 | 15.1 | 0.483 | 14.0 | 8.4 | 1.7 | 4.1 | excellent |
| Example 6 | 57.6 | 16.3 | 0.493 | 11.3 | 6.8 | 1.7 | 4.2 | excellent |
| Example 7 | 60.9 | 15.5 | 0.505 | 17.6 | 10.5 | 1.7 | 4.4 | good |
| Example 8 | 58.0 | 15.2 | 0.495 | 25.3 | 15.4 | 1.6 | 4.6 | acceptable |
| Example 9 | 63.1 | 14.9 | 0.529 | 7.0 | 3.6 | 1.9 | 4.2 | excellent |
| Example 10 | 55.0 | 15.0 | 0.470 | 15.0 | 8.8 | 1.7 | 4.3 | excellent |
| Example 11 | 60.5 | 16.2 | 0.505 | 18.0 | 9.8 | 1.8 | 4.1 | excellent |
| Example 12 | 49.2 | 17.4 | 0.321 | 21.8 | 10.9 | 2.0 | 3.5 | excellent |
| Comparative Example 1 | 61.3 | 10.1 | 0.536 | 4.7 | 3.2 | 1.5 | 3.8 | bad |
| Comparative Example 2 | 61.9 | 16.1 | 0.507 | 5.9 | 4.2 | 1.4 | 3.9 | bad |

Examples 2 to 12 and Comparative Examples 1 and 2

Porous materials (honeycomb structures) were prepared similarly to Example 1, except that conditions shown in Table 1 were used. Evaluations were performed similarly to Example 1. The results are shown in Table 1.

It is seen from Table 1 that the porous materials of Examples 1 to 12 have an excellent resistance to heat shock. Moreover, it is seen that the porous materials of Comparative Examples 1 and 2 have a poor resistance to heat shock.

A porous material of the present invention can be used as a material for a catalyst support, a material for a DPF or the like.

A honeycomb structure of the present invention can be used as the catalyst support, the DPF or the like.

What is claimed is:

1. A porous material which contains aggregates, and an amorphous binding agent to bind the aggregates to one another in a state where pores are formed among the aggregates,
    wherein the amorphous binding agent contains 8.0 to 15.0 mass % of MgO, 30.0 to 60.0 mass % of $Al_2O_3$, 30.0 to 55.0 mass % of $SiO_2$, and 1.5 to 10.0 mass % of a rare earth oxide in the whole binding agent.

2. The porous material according to claim 1,
    wherein a rare earth element of the rare earth oxide is at least one selected from the group consisting of yttrium, lanthanum, cerium, praseodymium, neodymium, samarium, europium, gadolinium, terbium, dysprosium, holmium, erbium, thulium, ytterbium and lutetium.

3. The porous material according to claim 1,
    wherein a ratio of a mass of the binding agent to a total mass of the aggregates and the binding agent is from 7 to 45 mass %.

4. The porous material according to claim 1, wherein the aggregates are silicon carbide particles or silicon nitride particles.

5. The porous material according to claim 1, wherein a porosity is from 52 to 70%.

6. The porous material according to claim 1,
wherein a bending strength is 10 MPa or more, and a bending strength/Young's modulus ratio is $1.7 \times 10^{-3}$ or more.

7. The porous material according to claim 1, wherein a coefficient of thermal expansion is $4.3 \times 10^{-6}$/K or less.

8. A manufacturing method of the porous material according to claim 1, comprising:
firing a raw material for the porous material according to claim 1 which contains aggregate powder and a raw material for the amorphous binding agent including a rare earth element, at 1400 to 1480° C. to prepare the porous material.

9. A honeycomb structure comprising:
partition walls which are constituted of the porous material according to claim 1 and with which a plurality of cells extending from one end surface to the other end surface are formed.

10. The honeycomb structure according to claim 9, comprising:
plugged portions arranged in open frontal areas of the predetermined cells in the one end surface and open frontal areas of the remaining cells in the other end surface.

* * * * *